Oct. 9, 1951          W. R. BONHAM          2,570,515
JAMMING ROLLER CLUTCH
Filed Nov. 26, 1948
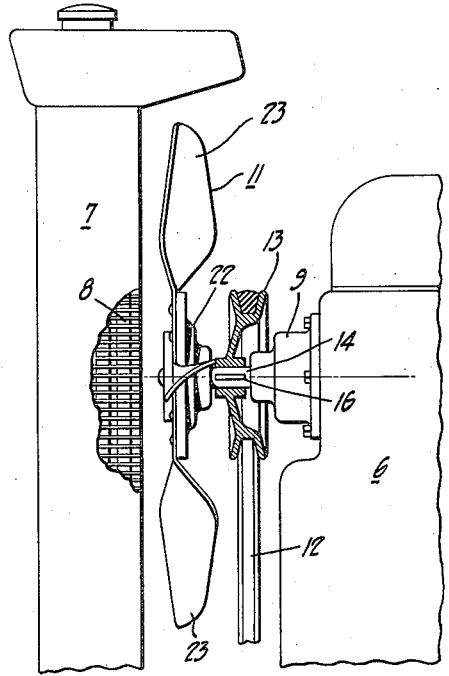
FIG_1_
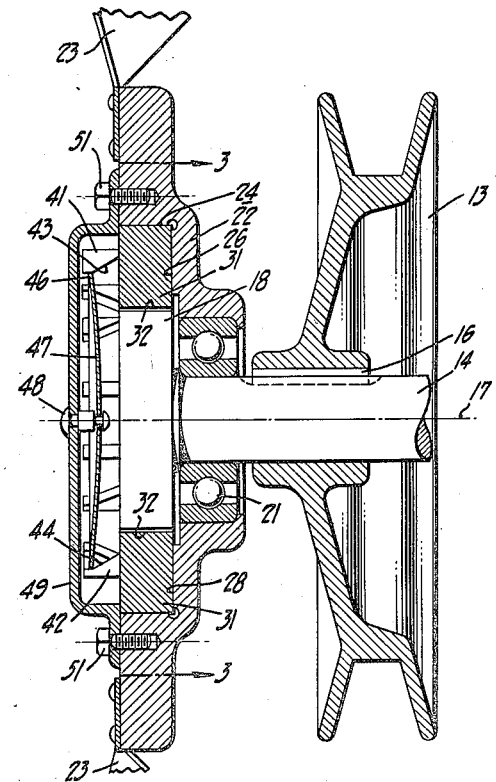
FIG_2_
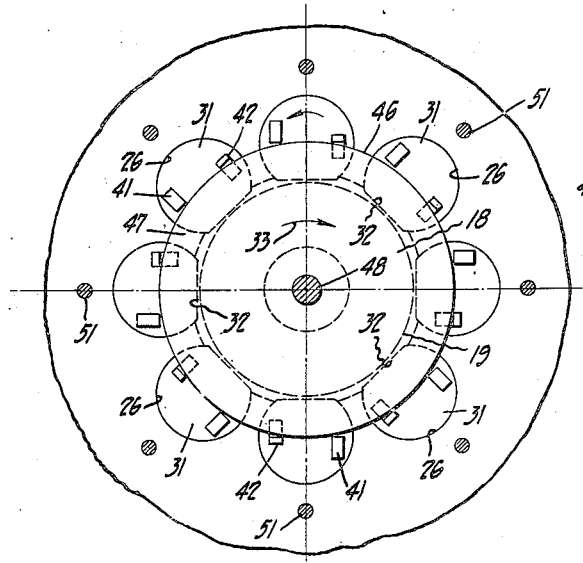
FIG_3_
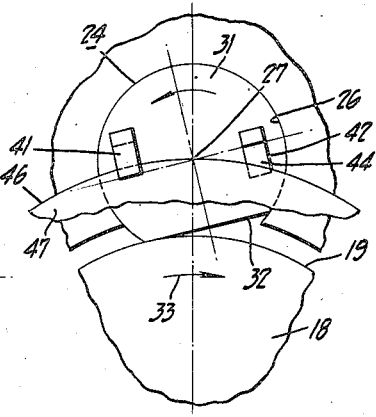
FIG_4_
INVENTOR.
Walter R. Bonham
BY Patented Oct. 9, 1951

2,570,515

UNITED STATES PATENT OFFICE 2,570,515

JAMMING ROLLER CLUTCH

Walter R. Bonham, Palo Alto, Calif.

Application November 26, 1948, Serial No. 62,109

5 Claims. (Cl. 192—41)

My invention relates to means for coupling and uncoupling members rotatable relative to each other and particularly such members arranged for rotation about a common axis.

It has been well-known for many years to couple relatively rotatable members together and then to release them in response to various actuating impulses, such as mechanical motions, thermostatic devices, electrical impulses and the like. One of the environments in which such mechanisms have been employed is in connection primarily with intermittently operating structures. While this category is relatively large, a suitable example is furnished by the customary automobile radiator fan. While the fan is normally operated all of the time that its associated engine is running, it is advisable, if it can be done simply, to couple and uncouple the fan from the driving mechanism, either in accordance with the operators control, or in automatic response to some energizing impulse such as the cooling air temperature, for example, especially such temperature of the air after it has been heated by being passed through the engine radiator core. Devices for this purpose in the past have either involved relatively intricate and expensive clutching devices or clutching devices which require too great an operating force for a delicate energizing mechanism or are mechanically difficult to manufacture or maintain or are expensive, or involve too radical a change in the normal environment of the structure, or have other drawbacks which have in general worked against the adoption of such mechanisms.

It is therefore an object of my invention in the present instance to provide a clutching arrangement which is generally adaptable to machinery which must be coupled and uncoupled.

Another object of my invention is to provide a clutching mechanism especially adaptable to intermittent service not limited to but, for example, as embodied in an automobile fan arrangement.

A further object of my invention is to provide a jamming roller clutch readily operated and released for coupling mechanisms together.

A further object of the invention is in general to improve clutching mechanisms.

An additional object of my invention is to provide an improved automotive fan clutching mechanism.

Other objects together with the foregoing are attained in the embodiment of the invention illustrated in the accompanying drawings in which Figure 1 is for the most part a side elevation of a jamming roller clutch mechanism installed in a typical environment, portions being broken away to disclose the interior construction.

Figure 2 is a cross-sectional view on a vertical axial plane to an enlarged scale showing a part of the structure of Figure 1.

Figure 3 is a cross-section the plane of which is indicated by the lines 3—3 of Figure 2, certain projections being disclosed in elevation.

Figure 4 is a view to an enlarged scale of one of the jamming rollers and its environment, portions being broken away to reduce the size of the figure and to disclose the interior construction.

In its preferred form the jamming roller clutch of my invention comprises driving and driven members arranged for rotation about a common axis. The driven member preferably is provided with recesses to receive a number of jamming rollers arranged with their own secondary axes parallel to the rotational axis. Each of the rollers is provided with camming projections engageable with an actuating device, for example a thermostat, so that the rollers can be revolved about their own individual secondary axes between extreme positions, in one of which the rollers couple the driving and driven members and in another of which the rollers uncouple the driving and driven members.

While it is by no means limited to installation in the environment shown, my jamming roller clutch is well explained in that connection. There is customarily provided an automotive type engine 6 associated with a water cooling radiator 7 having a core 8. Cooling water is circulated between the engine 6 and the radiator 7 by a pump 9 in the usual fashion. A cooling fan 11 induces a flow of air through the radiator core 8 and over the engine 6. The fan 11 is driven when required by a belt 12 deriving its power from the engine 6 and effective to rotate a pulley 13 mounted on a driving shaft 14 and connected thereto by a key 16. The pump 9 is also driven by the shaft 14 as the shaft turns about a first or primary rotational axis 17.

In accordance with my invention, the shaft 14 at its outboard end is enlarged to provide a drum or disc 18 preferably having a hardened peripheral surface 19 and disposed generally within the compass of the fan 11. Between the drum or disc 18 and the fan pulley 13 an anti-friction bearing 21 is mounted on the driving shaft 14 and serves as a support for a driven member 22. This encompasses the driving member 18 and, because of the bearing 21, is independently rotatable about the same axis 17. The driven member 22 is appropriately formed around its periphery to serve as an anchorage for the blades 23 of the fan and furthermore is internally formed to provide an interior surface 24 substantially opposite the surface 19 of the drum 18.

In order that the driving and driven members, normally freely rotatable with respect to each other can be coupled together when desired, I form the surface 24 of the driven member, not as a continuously curved surface, but rather to provide a series of pockets or journals 26, each concentric with a secondary axis 27 parallel to the rotational axis 17 and equidistantly disposed from and around the periphery of the drum 18. The recesses are bounded not only by the surfaces 24 but are likewise bounded by a planar radial surface 28 formed in the driven member 22.

Disposed in each one of the recesses 26 is a jamming roller 31 preferably comprising a circular cylindrical, disc-like member freely rotatable within the recess about the secondary axis 27 and being regularly formed except for a chordal flat surface 32 on one side. The location or dimension of the chordal surface 32 with respect to the axis 27 is such that in one rotated position of the roller 31 there is no physical contact between the roller and the driving member 18. When the roller is rocked about the axis 27 in one direction into a second position, there is a direct physical contact between the roller and the driving drum, and when the roller is rocked in the opposite direction into a third position, there is a direct physical contact between another part of the roller and the drum. These contacts are so arranged that in one direction of rotation, for example as shown in Figure 4, the rollers jam against the driving member 18 to carry their associated driven member 22 with them for one direction of rotation, as shown by the arrow 33, but will release in the other direction of rotation. When the rollers are oppositely rocked so that the other portions of each roller contact the driving member, the coupling and uncoupling movements take place in the opposite directions. That is, by oppositely rocking the roller, the driving and driven members can be locked together for driving in one sense of rotation and released in the other or can be locked together for driving rotation in the other direction and released in the first sense. If the roller occupies a middle or intermediate position, there is no driving connection between the driving and driven members. The number of rollers arranged around the periphery of the driving member distributes the relatively high coupling force and divides such force so that the localized stresses in the mechanism are moderate.

In order to actuate the individual rollers simultaneously and in accordance with some selected impulse, I provide each of them with a pair of eccentric cam projections 41 and 42 respectively. Each of the projections extends generally axially from the face of and is at the ends of a diameter of its associated roller 31. One of the projections, for example 41, is provided with an internal cam face 43 slanted in one direction, whereas its adjacent cam projection 42 is provided with a slanted cam face 44 having the opposite slope. The slopes of the two cam projections are arranged so that they will simultaneously be engaged by the edge 46 of a snap disc thermostat 47 concentrically mounted with respect to the remaining structure and secured by a central pin 48 on a closure plate 49 removably secured to the driven member 22 by fastenings 51. The material and location of the cover 49 are such that the temperature of the air passing through the radiator core 8 is rather promptly effective upon the snap disc thermostat 47.

When the snap disc is in the position shown in Figure 2, for example, it cams against one of the projections 41 or 42 to give all of the rollers 31 one or the other of their extreme positions, depending upon the design. When, however, the thermostat disc 47 snaps to its symmetrical but opposite position, it releases the cam surface 43, for example, at the same time that it presses against the cam surface 44. The rollers 31 are thus all given an increment of rotation sufficient either to cause them to engage or to release depending upon the particular design. Since an automobile engine and fan usually turn only in one direction, the rollers are moved only between a released position and one engaged position.

With this arrangement there is afforded a thermally responsive mechanism, either for engaging the clutch or disengaging the clutch formed by the jamming roller members. In the usual installation, the cam surfaces 43 and 44 and the thermostatic disc 47 are so related that during low temperature operation, when air passing through the core 8 is at a low temperature, the jamming rollers 31 do not engage the driving drum 18 and hence the fan 11 is stationary. As the temperature rises above a set value, however, the thermostatic disc 47 snaps into its opposite extreme position and in doing so cams the projections 41 and 42 to rotate the various rollers 31 and to couple the driven member 22 to the driving drum 18. This brings the fan 11 into operation and increases markedly the flow of air through the core 8. Following the operation of the fan for some time, the temperature of the ambient air should be somewhat decreased, and when it does decrease, the thermostat disc 47 returns to its initial position rotating the various jamming rollers 31 simultaneously and disengaging the mechanism so that the fan 11 is again idle.

While the thermostatic disc 47 operates automatically in response to temperature, it can be manually operated or the operator can as well cause rotation of the various rollers 31 about their secondary axes to couple and uncouple the jamming roller clutch as desired or to couple the clutch for automatic engagement in one direction of rotation and automatic disengagement in the other direction of rotation and depending upon the amount of rocking of the individual rollers, this particular coupling direction can be in either sense.

In general, therefore, I have provided a jamming roller clutch especially adapted for installation in the environment shown wherein it occupies very little more than the customary space capable of transmitting quickly the power required for the indicated service. Furthermore, the mechanism is quite simple in its mechanical construction and can be made for the most part with rather wide manufacturing tolerances so that the cost of construction is low. The maintenance is nominal since the entire unit can readily be replaced if necessary.

I claim:

1. A jamming roller clutch comprising a driving member arranged to rotate about a main axis, a driven member arranged to rotate about said axis, rollers carried by said driven member and rotatable about secondary axes parallel to said main axis between a first position free from said driving member and a second position engaging said driving member, eccentric cam projections extending axially from said rollers, and means movable axially in engagement with said projections for rotating said rollers about said secondary axes.

2. A jamming roller clutch comprising a driving member arranged to rotate about a main axis, a driven member arranged to rotate about said axis, rollers carried by said driven member and rotatable about secondary axes parallel to said main axis between a first position free from said driving member and a second position engaging said driving member, eccentric cam projections extending axially from said rollers, and a thermostat mounted on said driven member and movable axially in engagement with said projections for rotating said rollers about said secondary axes.

3. A jamming roller clutch comprising a driving member arranged to rotate about a main axis, a driven member arranged to rotate about said axis, rollers carried by said driven member and rotatable about secondary axes parallel to said main axis between a first position free from said driving member and a second position engaging said driving member, cam projections extending generally axially from said rollers substantially at the diameter ends thereof, said cam projections having oppositely slanted faces, and axially movable means engageable with said faces for rotating said rollers.

4. A jamming roller clutch comprising a driving member arranged to rotate about a main axis, a driven member arranged to rotate about said axis, rollers carried by said driven member and rotatable about secondary axes parallel to said main axis, said rollers having flat faces arranged in one rotated position of said rollers to clear said driving member and in another rotated position of said rollers to engage said driving member, cam projections on said rollers, and means engaging said cam projections for rotating said rollers between said rotated positions.

5. A jamming roller clutch comprising a driving member arranged to rotate about a main axis, a drum on said driving member, a driven member encompassing said drum, said driven member having internal pockets therein, rollers in said pockets and movable between a position engaging said drum and another position free from said drum, a thermostat mounted on said driven member, and means engaged by said thermostat for moving said rollers between said positions.

WALTER R. BONHAM.

REFERENCES CITED

The following references are of record in the file of this patent:

UNITED STATES PATENTS

| Number | Name | Date |
|---|---|---|
| 1,160,529 | Pinkham | Nov. 16, 1915 |
| 1,163,803 | Bickford | Dec. 14, 1915 |
| 1,909,831 | Jensen | May 16, 1933 |
| 2,214,391 | Weydell | Sept. 10, 1940 |

FOREIGN PATENTS

| Number | Country | Date |
|---|---|---|
| 251,521 | Germany | Oct. 4, 1912 |